Dec. 22, 1970          R. L. McGUIRE          3,548,674
                    CONTROL VALVE LINKAGE
Filed June 2, 1969                      3 Sheets-Sheet 1
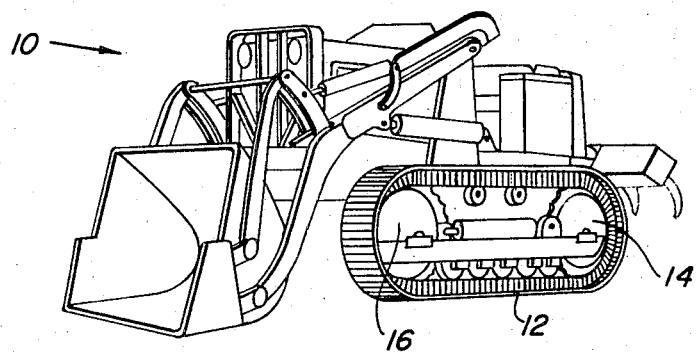
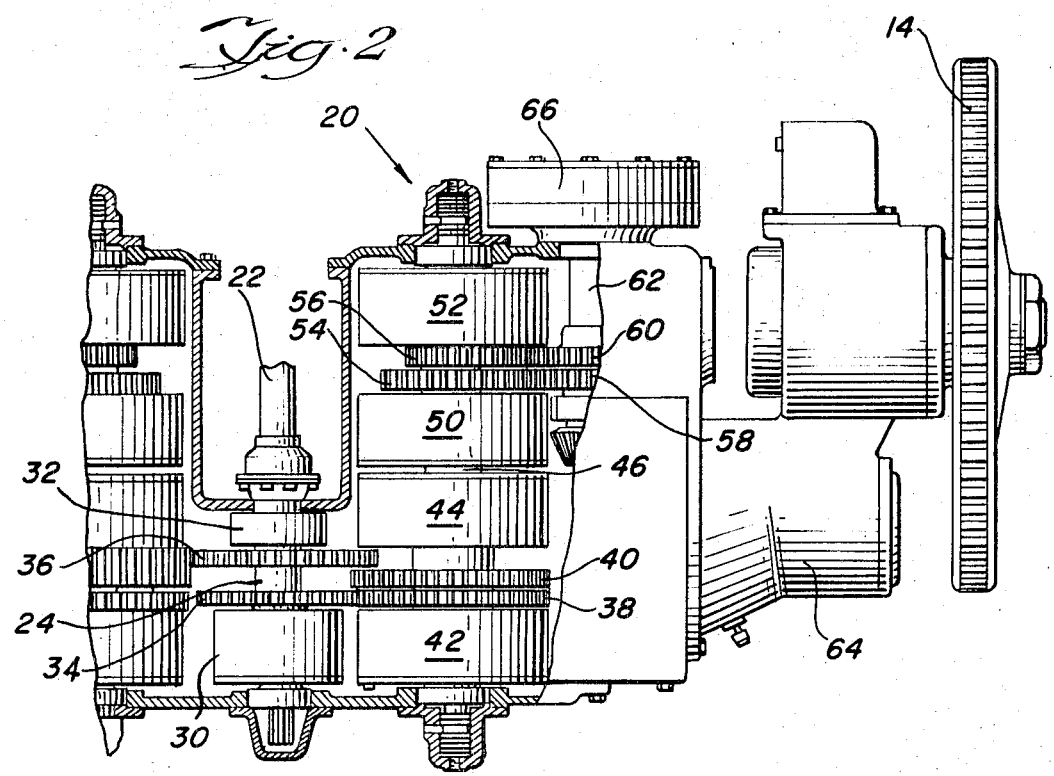
INVENTOR
ROBERT L. McGUIRE
BY Dressler, Goldsmith, Clement & Gordon
ATTORNEY

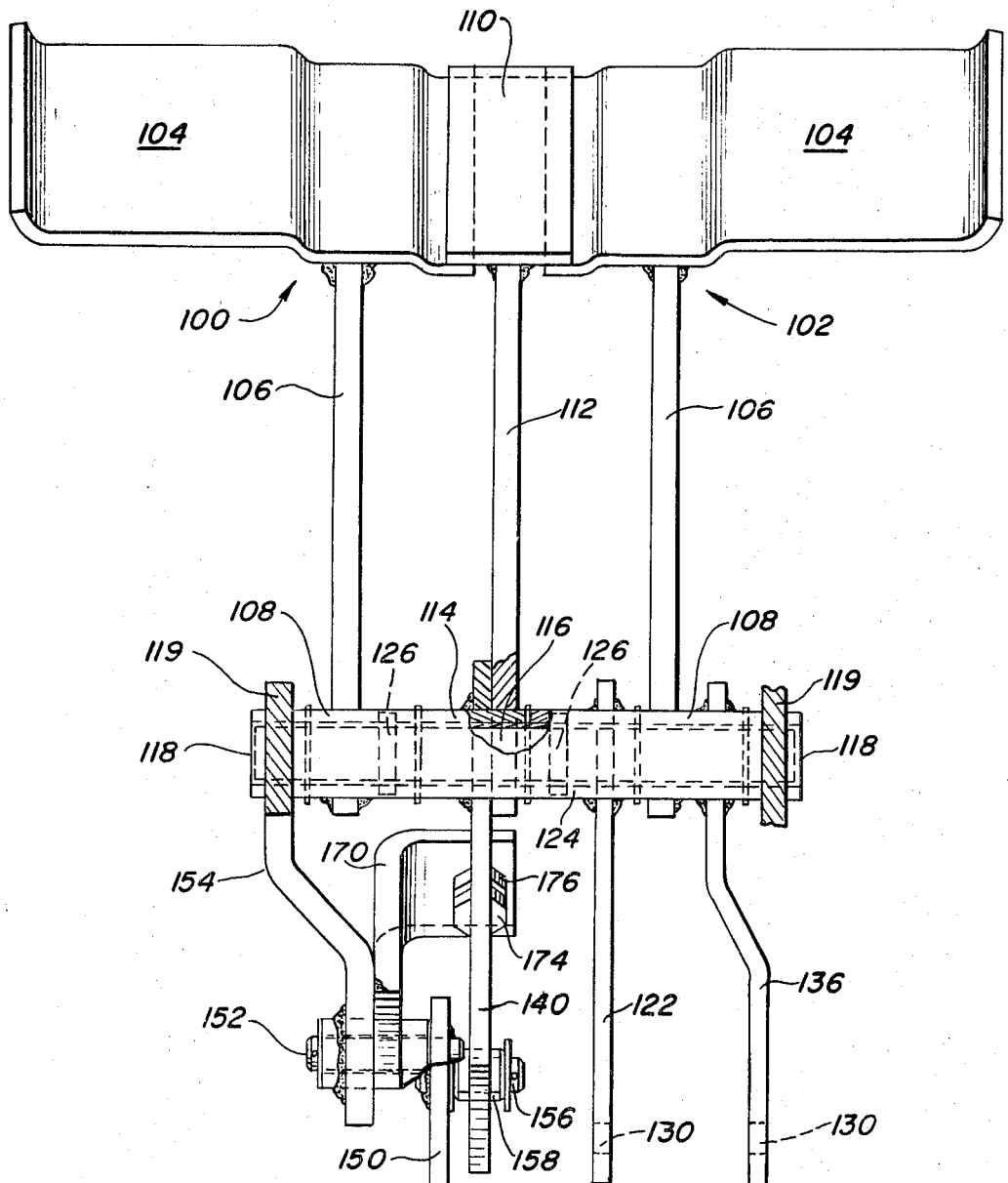

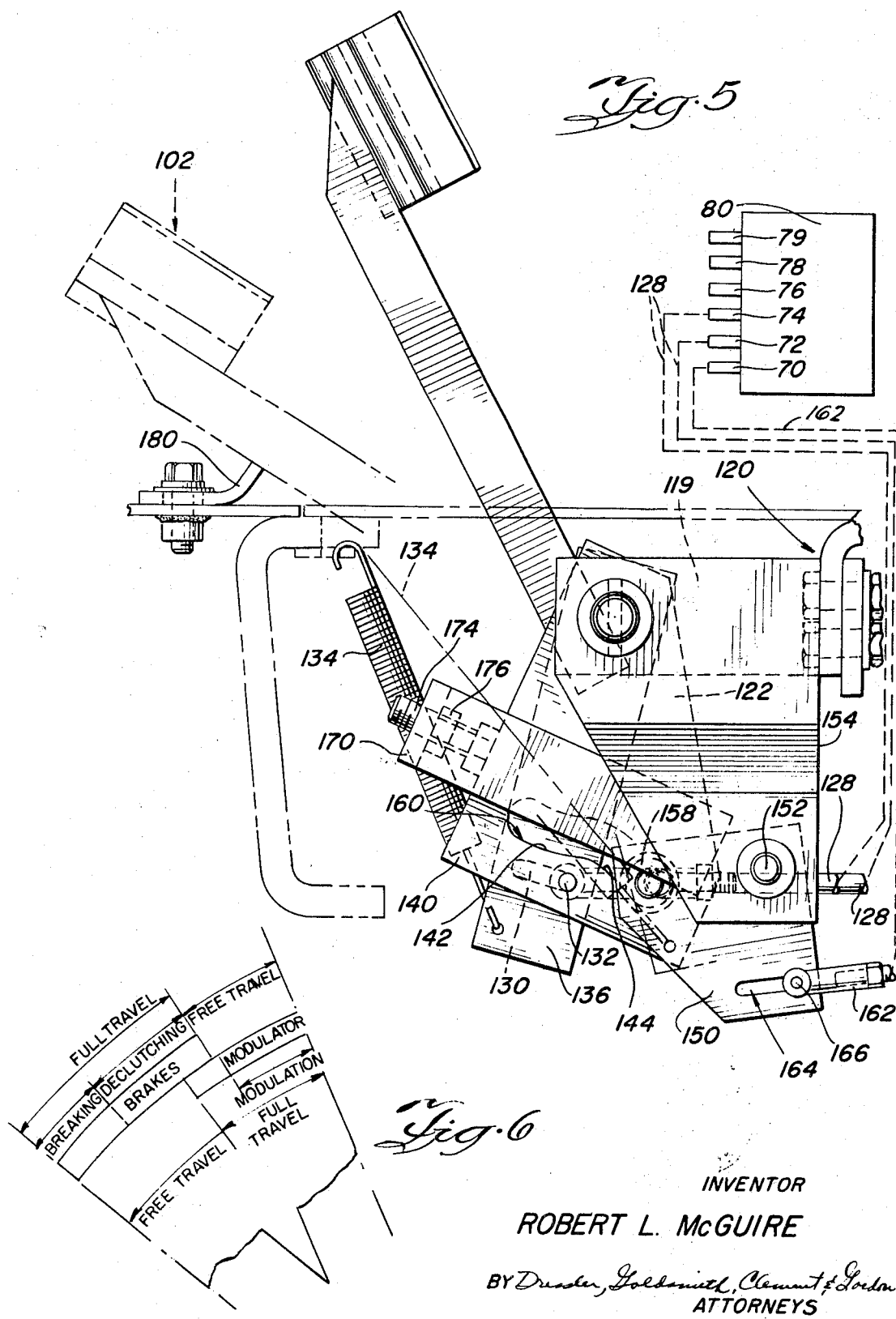

United States Patent Office 3,548,674
Patented Dec. 22, 1970

3,548,674
CONTROL VALVE LINKAGE
Robert L. McGuire, Burlington, Iowa, assignor to
J. I. Case Company, a corporation of Wisconsin
Filed June 2, 1969, Ser. No. 829,595
Int. Cl. G05g 13/00
U.S. Cl. 74—478.5                    10 Claims

ABSTRACT OF THE DISCLOSURE

This application relates to linkage means for interconnecting two brake pedals and a modulating valve pedal to respective valves for allowing simultaneous actuation of all pedals and individual actuation of the brake pedals. During simultaneous actuation, the linkage causes movement of the modulating valve and then subsequently movement of the brake valves while maintaining the modulating valve in the moved condition. The modulating pedal cooperates with both brake pedals to cause simultaneous actuation of the brake pedals upon actuation of the modulating pedal.

BACKGROUND OF THE INVENTION

The present invention relates generally to hydraulic control systems and more particularly to an improved linkage for interconnecting a pluralty of control devices to respective actuating members.

While not specifically limited to any particular environment, the present invention will be described in connection with a hydraulic control circuit of the type disclosed in copending application Ser. No. 837,547, filed on June 30, 1969, by Robert Honeyager and James Rigney for "Transmission Control System," and assigned to the assignee of the present invention and is incorporated herein by reference as an illustrative control system which may be operated by the present invention. The above mentioned application discloses a hydraulic control circuit for a transmission which includes a modulating valve manually operable to control the pressure of fluid supplied to a fluid clutch which must be in engaged position for providing a power train through the transmission. The above application also discloses individual control valves which control the flow of pressured fluid to fluid operated brakes which form part of the transmission unit.

The modulating valve incorporated in the circuit of the application disclosed hereinabove, is capable of completely neutralizing the power train at the discretion of the operator during any speed or direction of either or both tracks of a crawler tractor. Furthermore, the brake control valves are incorporated into the circuit for each track so as to neutralize the power train to a particular track before the brake for the associated track is actuated.

The hydraulic control circuit disclosed in the above mentioned application requires at least one control lever or member for controlling the movement of the valve spool for each of the tracks, a range control lever or member, separate brake actuating mechanism for each of the tracks, and a further actuating mechanism for manual operation of the modulating valve.

During operation of such a control mechanism, it is normal for the operator to keep his hands on the respective control levers for each of the tracks and to manipulate the brakes with separate brake pedals. However, this still leaves the operation of the range control and the modulating control valves which must be done by the operator. Furthermore, it is desirable to be able to simultaneously cause engagement of the brakes when the modulating valve is utilized for neutralizing the entire transmission, as in case of an emergency stop. While it would be conceivable to provide a further manual control lever for operating the modulating valve to thereby allow the operator to use one hand for such an operation while utilizing his feet to operate the brakes, such an operation is undesirable since it requires considerable dexterity in appropriate actuation of the respective devices to cause a neutralization of the transmission just prior to application of the brakes.

SUMMARY OF THE INVENTION

The present invention contemplates actuation of the above mentioned modulating valve with a foot pedal which cooperates with the two brake pedals to provide simultaneous actuation of the three valves by merely engaging the pedal cooperating with the modulating valve. This is accomplished by having the modulating valve pedal overlapping the two brake pedals so as to cause simultaneous movement of all three pedals when the modulating valve pedal is depressed.

The present invention contemplates a linkage system connecting the modulating valve pedal to the modulating valve spool so as to cause actuation of the modulating valve during a first portion of travel of the pedal and maintaining the valve in actuated condition during the remaining portion of travel. Further links connect the respective brake pedals to the control valve for the respective brakes in a manner that free travel is possible during the first portion of movement of the brake pedals and engagement of the valves during a later portion of travel.

The linkage system includes a pair of pivoted plates respectively cooperating with the modulating valve pedal and the modulating valve spool with one of the plates having a camming surface defined thereon and the second plate having a cam member received in engagement with the camming surface. The camming surface is designed so as to cause relative movement of the second plate during the first portion of travel of the first plate.

The linkage for connecting the brake pedals to the respective brake control valves includes a lost motion connection allowing movement of the brake pedal during a first portion of travel without movement of the brake control valve. Thus, operation of the modulating pedal will automatically cause (1) actuation of the modulating valve and (2) subsequent actuation of both brakes.

Thus, the primary object of the present invention is to provide an improved linkage system for interconnecting an actuating member with a control device.

Another object is to provide an improved linkage which accommodates sequential movement of a plurality of devices by actuation of a single control member.

Other objects and advantages of the present invention will become apparent when considering the following detailed description in connection with the accompanying drawings.

BRIEF DESCRIPTION OF DRAWINGS

FIG. 1 is a perspective view of a vehicle which is capable of having the present invention incorporated therein;

FIG. 2 is a fragmentary plan view partially in section of the transmission control unit which is operated by the present invention;

FIG. 3 is a plan view of the linkage and pedal arrangement of the present invention with parts broken away for clarity;

FIG. 4 is an end view of the pedal arrangement;

FIG. 5 is a side elevation view of the linkage and pedal arrangement shown in FIG. 3; and FIG. 6 is a schematic illustration of the movement of the various control devices during a cycle of operation.

DETAILED DESCRIPTION

FIGS. 1 and 2 of the drawings disclose generally the environment for the present invention which includes a vehicle 10 of the crawler-track type. The vehicle 10 includes a pair of tracks 12, only one of which is shown, driven by a drive sprocket 14 and supported on an idler sprocket 16.

As shown in FIG. 2, the vehicle 10 includes a transmission unit 20 having an input 22 connected to a power source (not shown) with gearing and clutches interposed between the input shaft 22 and each of the drive sprockets 14. Since the drive train for each track is identical, only one will be described in detail and the right-hand track has been selected for purposes of illustration.

The input shaft 22 is adapted to be connected to an intermediate shaft 24 by the selective engagement of either clutch or fluid coupling 30 or 32. Thus, the countershaft 24 may be rotated at either of two ranges with respect to the input shaft 22. The countershaft 24 is coupled to a further intermediate shaft 46 through gears 34 and 36, respectively associated with fluid couplings 30 and 32 and in mesh with gears 38 and 40. The gears 38 and 40 are respectively coupled to fluid couplings or clutches 42 and 44 and the shaft 46 to drive the shaft in either of two directions.

The power train for the right-hand transmission unit further includes an additional pair of fluid couplings or clutches 50 and 52 respectively associated with gears 54 and 56 that are in mesh with gears 58 and 60 carried on a further countershaft 62 so that the shaft 62 may be driven at either of two speed ratios with respect to the shaft 46. The drive sprocket 14 is coupled to the countershaft 62 by suitable gearing supported in a housing 64 for the transmission 20. Also, the countershaft 62 has a fluid coupling or brake 66 cooperating with a free end thereof to provide powered braking for the right-hand drive sprocket 14.

The hydraulic control system disclosed in the above mentioned application, provides a pair of control valves respectively operable by individual control levers to produce engagement and disengagement of the respective clutches or fluid couplings 42, 44, 50 and 52. The invention disclosed in that application also incorporates control valves for supplying pressured fluid to the fluid couplings or brakes 66, and a separate control valve for controlling the range clutches 30 and 32. Also, the hydraulic control system further includes a modulating valve which is capable of controlling the pressure of fluid supplied to fluid couplings 30 and 32 to provide a controlled engagement and disengagement of the power train from the input shaft 22 through the transmission unit to either of the drive sprockets 14. For purposes of brevity, the control valves have been shown as a bank of control valves 70–79 supported in a housing 80. The control valves 72 and 74 respectively control the flow of pressured fluid to the respective brakes 66 forming part of the left and right-hand drive trains for the sprockets 14 while valve 70 forms a part of a modulating control mechanism described and claimed in the above mentioned application. Control valves 76 and 78 respectively control the engagement of fluid couplings 42, 44, 50 and 52 for the left and right-hand drive units while control valve 79 controls engagement of clutches 30 and 32.

According to the present invention, the three control valves or devices 70, 72 and 74 are adapted to be actuated by actuating members in the form of foot pedals disposed in the operator's compartment of the vehicle. The foot pedals for the respective control devices or brake control valves 72 and 74 are adapted to be individually actuated while the modulating pedal cooperates with the two brake pedals to provide simultaneous movement of all three pedals at any time the modulating pedal is depressed.

According to another aspect of the present invention, the linkage connection between the respective foot pedals provides for sequential actuation of the modulating valve and the subsequent actuation of the two brake valves whenever the modulating pedal is actuated.

As shown in FIG. 3, the brake pedals or actuating members 100 and 102 each include a pedal member 104 fixed to one end of arm 106 which has a hub 108 fixedly secured to the opposite end thereof. The modulation valve actuating member includes a pedal portion 110 having opposed edges overlapping edge portions of the respective foot pedals 104 (FIG. 4) and having an arm 112 fixedly secured thereto, the free end of which is carried by a hub 114. The respective hubs 108 and 114 are supported on a support mechanism including a shaft 116 rotatably supported in hubs 118 fixed to depending legs 119 forming part of a bracket 120.

The actuating mechanism for the left-hand control valve 72 further includes an arm 122 having a hub 124 on one end thereof and connected to the hub 108 through support shaft 116 and transversely extending pins 126. Thus, depression of the foot pedal 104 for the left-hand brake will cause simultaneous rotational movement of the arms 106 and 122 about the axis defined by shaft 116.

The free end of the arm 122 is connected through adjustable rod 128 to the end of the valve 72 and the adjustable rod is connected to the free end of the arm through a lost motion connection in the form of an elongated slot 130 receiving pin 132 carried on the end of the rod 128, for a purpose which will become apparent hereinafter. The left-hand brake actuating mechanism further includes a spring 134 for automatically returning the brake pedal, as well as the valve spool, to the disengaged or neutral condition upon release of the pressure on the pedal 104.

The connection of the right-hand actuating member 102 is substantially identical with the exception that a second arm 136 is connected directly to hub 108 rotatable on shaft 116 and the free end of the arm 136 is connected through a link identical to link 128 with a lost motion connection in the form of the elongated slot 130 defined on arm 136.

Thus, during the first portion of movement of the brake control pedal for either the left-hand or right-hand brake, the associated pin 132 will slide within elongated slot 130 to allow relative movement of the pedal 104 without actuation of the control valve associated therewith, for a purpose which will become apparent hereinafter.

The linkage connection between modulating pedal 110 and the associated control valve 70 incorporates mechanism which will cause actuation of the valve during the first portion of travel of the pedal and maintain the valve 70 in the actuated condition during the remaining portion of travel.

For this purpose, the mechanism for connecting the pedal 110 to the modulating control valve 70 includes arm 140 having one end fixedly secured to the hub 114. Adjacent the free end of the arm 140 there is provided a camming surface which includes a circumferentially extending portion 142 which is spaced from the pivot axis for the hub 114 which is defined by shaft 116. Adjacent one end of the circumferential camming surface, the camming surface has an angularly related portion 144. A second plate 150 is pivoted by a pin 152 on a depending bracket 154. Spaced from the pivot pin 152, the plate 150 has a pin 156 extending therefrom which supports a roller 158 received in a slot 160 in arm 140 and defining the camming surfaces 142 and 144. The second plate 150 is connected to control valve 70 through adjustable rod 162 with the adjacent end of rod 162 connected to plate 150 at a point spaced from pins 152 and 156. The connection between rod 162 and plate 150 includes a lost motion connection comprising slot 164 in plate 150 and a pin 166 received in slot 164 and secured to rod 162.

Means are also provided for defining a neutral position for the modulating pedal 110 as well as engaged positions for the respective brake pedals 104. The neutral position for modulating pedal 110 is defined by an angle iron 170 fixedly secured to the support arm 154. One leg of the bracket 170 receives a bolt 174 having a lock nut 176 thereon with the head of the bolt 174 disposed in the path of the plate 140. The means for defining the engaged position for each brake respectively include a bracket 180 bolted to the floorboard of the tractor and disposed in the path of the associated arm 106.

OPERATION

Assuming that the operator wishes to stop the tractor, it is only necessary for him to depress the foot pedal 110 which automatically neutralizes the transmission and subsequently applies the brakes for each of the tracks.

During the first portion of travel of the foot pedal 110, which also depresses or moves the foot pedals 104, the counterclockwise rotation of arm 140 fixedly secured to foot pedal 110 will cause a sliding movement of roller 158 along the flat chordal portion or camming surface 144 to produce a clockwise rotation of the link or plate 150. Such clockwise rotation of the link 150 will cause an axial shifting of the adjustable rod 162 to move the valve 70 causing a modulation of fluid pressure to the engaged range clutch 30 or 32, as is more clearly described in the above mentioned copending application.

Once the modulating control valve is moved to its completely disengaged position, thereby reducing the pressure of fluid to clutch 30 or 32 to zero, the control valve 70 is maintained in such position by the circumferential or arcuate camming surface 142 defined on the end of camming surface 144. It is believed apparent that the extent of movement of control valve 70 is dependent upon the length of the camming surface 144.

The lost motion connection between the foot pedals 104 and the respective actuating rods 128, defined by elongated slots or openings 130, allows relative movement between the foot pedals and the control rods without movement of the rods during the above mentioned actuation of the modulating control valve 70. Once the modulating control valve 70 is in the actuated condition, the pins 132 on the respective actuating rods 128 will engage the left-hand end of slots 130 to thereby cause a subsequent movement of the control rods 128 and the respective valves 72 and 74 in response to movement of the pedals 104. Movement of the control rods 128 will first cause an automatic declutching of the engaged clutches for each of the tracks, as is more clearly explained in the above mentioned copending application and Baker Pat. No. 3,017,941. Once the declutching operation has been accomplished, the braking of the various tracks will be accomplished through engagement of the fluid couplings 66 associated with the respective power trains for each of the tracks.

The sequence of operation just described is schematically illustrated in FIG. 6 where it can be seen that during the first portion of travel of the three foot pedals 104 and 110, the modulating valve will be moved through the modulation condition and will subsequently be completely disengaged, as defined by the "full travel" of the modulator pedal shown in FIG. 6. During the first portion of this travel, the lost motion connection defined in each of the brake pedal linkage mechanisms will allow free travel of the foot pedals without movement of either of the brake valves. However, once the modulating valve is moved beyond the modulation portion of the cycle, the brake control spools will begin to move causing the declutching operation for each of the tracks. Subsequently, the actual braking of the entire transmission will be accomplished during the last portion of travel of the brake control pedals which moves the control valves 72 and 74 to the actuated position.

To move the control pedals and the associated valves from the actuated to the neutral condition, it is only necessary for the operator to relieve the pressure applied to foot pedal 110. When the pressure is relieved, the springs 134 associated with links 122 and 136 will cause a clockwise rotation of the associated foot pedals 104 and such clockwise rotation of the pedals 104 will also cause a clockwise rotation of the modulating pedal 110 because the latter pedal overlaps the former pedals. During the first counterclockwise movement of all of the pedals, the pins 132 will again move within slots 130 and subsequently will engage the opposite end of the slots 130 to cause an axial shifting of the respective rods 128 to move the brake control valves to their disengaged positions. During the relative movement between pedals 104 and rods 128, the roller 158 will move in the arcuate portion 142 of slot 160 to maintain valve 70 in the engaged position. Furthermore, the lost motion connection 164, 166 will allow links 140 and 150 and modulating pedal 110 to move to the completely disengaged position without affecting the engaged position of valve 70.

Alternatively, if it is desired to actuate either brake independently it is only necessary to engage the associated actuating members 100 or 102 and the respective brakes may be independently actuated without affecting the modulating valve 70.

It should also be noted at this point that the modulating control valve 70 can be moved through the modulation cycle to reduce the pressure of the fluid acting on either of the fluid couplings 30 and 32 between the full system pressure or at any pressure between such full system pressure and the completely dumped condition by controlled movement of the foot pedal 110. Again, this operation is more clearly described in the above mentioned copending application.

During such modulation operation of the control valve 70, the free travel of the respective brake control pedals 104, shown in FIG. 6, will allow such modulation without any movement of either of the control valve spools 72 and 74. This condition again is accomplished by the lost motion connection defined between links 128 and 136.

As can well be appreciated, the present invention provides a simple and efficient manner of completely stopping a moving vehicle by mere actuation of a single control pedal which, through the improved linkage connection, automatically provides sequential operation of various control valves. Such an arrangement is highly desirable since it allows the operator to continue to direct his attention to the respective hand operated control levers associated with each of the tracks and also allows him to, at any time, neutralize the entire tractor.

What is claimed is:

1. In combination with first and second control mechanisms each including an actuating member and a control member, linkage means between said first actuating member and control member comprising first and second arms supported for movement relative to each other and respectively operatively connected to said first actuating member and said control member, first means on one of said arms defining a camming surface having a first portion for moving said other of said arms and said control member in response to movement of said one of said links and a dwell portion for maintaining said other of said links in moved position, second means on the other of said arms engaging said camming surface, and linkage mechanism interconnecting said second actuating member and control member for moving said second control member after said first control member is in said moved position whereby simultaneous movement of said actuating members will cause sequential movement of said control members.

2. The combination as defined in claim 1, in which said first and second arms are respectively pivoted on first and second spaced parallel pivot axes.

3. The combination as defined in claim 1, the further improvement of said linkage mechanism including means defining a lost motion connection between said second actuating member and control member accommodating relative movement between said second members during a portion of movement of said second actuating member.

4. The combination as defined in claim 1, including the further improvement of said first means defining a slot on said one of said arms and having an arcuate portion defining said dwell portion and a straight portion on one end of said arcuate portion and defining said first portion, and second means comprising a pin carried by said other of said arms and received in said slot.

5. The combination as defined in claim 1, including the further improvement cooperating means on said actuating members for (1) simultaneously moving said second actuating member in response to movement of said first actuating member and (2) accommodating independent movement of said second actuating member.

6. In combination with first and second pedals and first and second control valves, linkage means connecting said pedals to said valves and comprising a first arm connected to said first pedal and pivoted about a first pivot axis, a second arm operatively connected to said first control valve and pivoted about a second pivot axis spaced from said first pivot axis, first means defining an elongated slot on one of said arms and having a circumferential portion radially spaced from said first axis and a chordal portion laterally offset from said first axis, second means on the other of said arms spaced from said second pivot axis and slidably received in said slot whereby pivoting of said first arm will pivot said second arm, and mechanism interconnecting said second pedal and control valve and including third means allowing relative movement between said second pedal and said second control valve while said second means is in said chordal portion of said slot whereby simultaneous movement of said pedals will cause sequential movement of said control valves.

7. The combination as defined in claim 6, including the further improvement of said mechanism comprising an arm operatively secured to said second pedal and pivoted about said first pivot axis, said third means comprising means defining an elongated opening in said arm extending parallel to and spaced from said first pivot axis and a rod having one end connected to said second control valve and having a portion on the opposite end received in said opening.

8. The combination as defined in claim 6, including the further improvement of said first pedal having a portion overlapping said second pedal to cause simultaneous actuation of said pedals when said first pedal is actuated while allowing independent actuation of said second pedal.

9. The combination as defined in claim 6, including the further improvement of the operative connection between said first control valve and said second arm comprises a lost motion connection allowing said first pedal to move from an engaged to a disengaged position without movement of said first controrl valve.

10. Actuating mechanism for first, second and third control valves comprising first, second, and third foot pedals pivoted about a common pivot axis, first, second and third arms operatively secured to respective ones of said pedals for movement therewith, means defining elongated openings in each of said arms spaced from said axis with said opening in said third arm having first and second angularly related portions, an arm pivoted about a pivot axis spaced from said common pivot axis and having a pin carried thereon and received in said opening of said third arm, first and second members having first ends received in respective openings in said first and second arms and second ends respectively connected to the first and second control valves, a third member having one end secured to said arm in spaced relation to said pivot axis and said pin and an opposite end secured to said third control valve, and means on said third pedal causing simultaneous movement of all pedals when said third pedal is actuated and allowing independent actuation of said first and second pedals, said openings being correlated to cause actuation of the third control valve and subsequent actuation of said first and second control valves.

References Cited

UNITED STATES PATENTS

| 2,935,892 | 5/1960 | Hodek | 74—480 |
| 3,262,525 | 7/1966 | Ehlke et al. | 74—478.5X |

MILTON KAUFMAN, Primary Examiner

U.S. Cl. X.R.

74—480, 512; 192—13